US009964983B2

(12) United States Patent
Cai et al.

(10) Patent No.: US 9,964,983 B2
(45) Date of Patent: May 8, 2018

(54) MICRO DEMAND RESPONSE SCHEDULING

(71) Applicant: FUJITSU LIMITED, Kawasaki-shi, Kanagawa (JP)

(72) Inventors: Wuhan Desmond Cai, Pasadena, CA (US); Jorjeta Jetcheva, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 521 days.

(21) Appl. No.: 14/594,008

(22) Filed: Jan. 9, 2015

(65) Prior Publication Data

US 2016/0187908 A1 Jun. 30, 2016

Related U.S. Application Data

(60) Provisional application No. 62/098,207, filed on Dec. 30, 2014.

(51) Int. Cl.

*F24F 11/00* (2006.01)
*G05B 13/04* (2006.01)
*G05F 1/66* (2006.01)

(52) U.S. Cl.

CPC .............. *G05F 1/66* (2013.01); *F24F 11/006* (2013.01); *F24F 2011/0058* (2013.01); *F24F 2011/0073* (2013.01)

(58) Field of Classification Search

CPC ............. F24F 11/006; F24F 2011/0058; F24F 2011/0073; G05F 1/66

See application file for complete search history.

(56) References Cited

U.S. PATENT DOCUMENTS 9,002,761 B2 * 4/2015 Montalvo .............. G06Q 10/06 322/38
2014/0148953 A1 * 5/2014 Nwankpa ........... G06Q 10/0631 700/276

(Continued)

FOREIGN PATENT DOCUMENTS

WO WO 2014039291 A1 * 3/2014 ............. G05B 15/02

OTHER PUBLICATIONS

Mathieu, Johanna, et al. "State estimation and control of electric loads to manage real-time energy imbalance." Power Systems, IEEE Transactions on , vol. 28, No. 1, pp. 430-440, Feb. 2013.

(Continued)

*Primary Examiner* — Abdelmonim Elamin
(74) *Attorney, Agent, or Firm* — Maschoff Brennan

(57) ABSTRACT

A method includes generating a duty cycle expression for heating, ventilation, air condition (HVAC) systems. The method includes estimating a baseline cycling percentage that maintains an indoor temperature at a particular setpoint based on the generated duty cycle expression and a curtailed cycling percentage that maintains the indoor temperature within a particular temperate interval of the particular setpoint. The method includes calculating a baseline-off-duration in which the HVAC system is in an off state during a normal operating cycle and a curtailed-on-duration implemented during a curtailment period. The method includes adjusting the curtailed-on-duration and the baseline-off-duration to satisfy a minimum-time-on and a minimum-time-off constraint of each HVAC system. The method includes identifying one or more HVAC systems to include in a micro DR event. The method includes assigning curtailment start times for the identified HVAC systems and executing the micro DR event according to the curtailment start times.

20 Claims, 9 Drawing Sheets

(56) References Cited

U.S. PATENT DOCUMENTS

| | | | | |
|---|---|---|---|---|
| 2015/0244172 A1* | 8/2015 | Trudel | H02J 3/12 307/129 |
| 2015/0345812 A1* | 12/2015 | Murthy | F24F 11/001 700/276 |
| 2015/0346741 A1* | 12/2015 | Murthy | G05B 15/02 700/276 |
| 2016/0091904 A1* | 3/2016 | Horesh | G05B 15/02 700/276 |

OTHER PUBLICATIONS

Meyn, Sean, et al. "Ancillary service to the grid from deferrable loads: the case for intelligent pool pumps in Florida." Decision and Control (CDC), 2013 IEEE 52nd Annual Conference on , vol., No., pp. 6946-6953, Dec. 10-13, 2013.

Hao, He, et al. "A generalized battery model of a collection of thermostatically controlled loads for providing ancillary service." Annual Allerton Conference, Oct. 2013.

Alizadeh, Mahnoosh, et al. "Least laxity first scheduling of thermostatically controlled loads for regulation services." GlobalSIP Conference, Dec. 2013.

Pruckner, Marco, et al. "A Study on the impact of packet loss and latency on real-time demand response in smart grid." Globecom Workshops Dec. 2012.

Guo, Feng, et al. "Comprehensive real-time simulation of the smart grid." Industry Applications, IEEE Transactions on , vol. 49, No. 2, pp. 899-908, Mar. 2013.

Pourmousavi, S. Ali, et al. "Real-time central demand response for primary frequency regulation in microgrids." Smart Grid, IEEE Transactions on , vol. 3, No. 4, pp. 1988-1996, Dec. 2012.

Ulrich Herberg et al., "OpenADR 2.0 Profile Specification B Profile" OpenADR 2.0b Profile Specification, Jul. 1, 2013.

OpenADR 2.0 Profile Specification A Profile, OpenADR 2.0a Profile Specification, 2011.

* cited by examiner

MICRO DEMAND RESPONSE SCHEDULING

CROSS-REFERENCE TO RELATED APPLICATION

This patent application claims the benefit of U.S. Patent Application No. 62/098,207, filed Dec. 30, 2014, which is incorporated herein by reference.

FIELD

The embodiments discussed herein are related to micro demand response scheduling.

BACKGROUND

Utilities incentivize curtailment of energy usage during certain high load periods to increase the ability of the utilities to meet a larger demand or to reduce production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of micro demand response (DR) scheduling includes, for one or more heating, ventilation, air condition (HVAC) systems that are located at a plurality of sites and configured for participation in a DR event, generating a duty cycle expression, such as a duty cycle equation. The method includes estimating a baseline cycling percentage that maintains an indoor temperature at a particular setpoint based on the generated duty cycle expression. The method includes estimating a curtailed cycling percentage that maintains the indoor temperature within a particular temperate interval of the particular setpoint. The method includes calculating a baseline-off-duration in which the HVAC system is in an off state during a normal operating cycle. The method includes calculating a curtailed-on-duration that is implemented during a curtailment period. The method includes adjusting the curtailed-on-duration to satisfy a minimum-time-on (min-on) constraint and a minimum-time-off (min-off) constraint of the HVAC system. The method includes adjusting the baseline-off-duration to satisfy the min-on constraint and the min-off constraint. The method includes identifying one or more HVAC system to include in a micro DR event based on an average curtailed load of the HVAC systems and an average uncurtailed load of the HVAC systems. The method includes assigning curtailment start times for the identified HVAC systems. The method includes executing a micro DR event according to the assigned curtailment start times.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
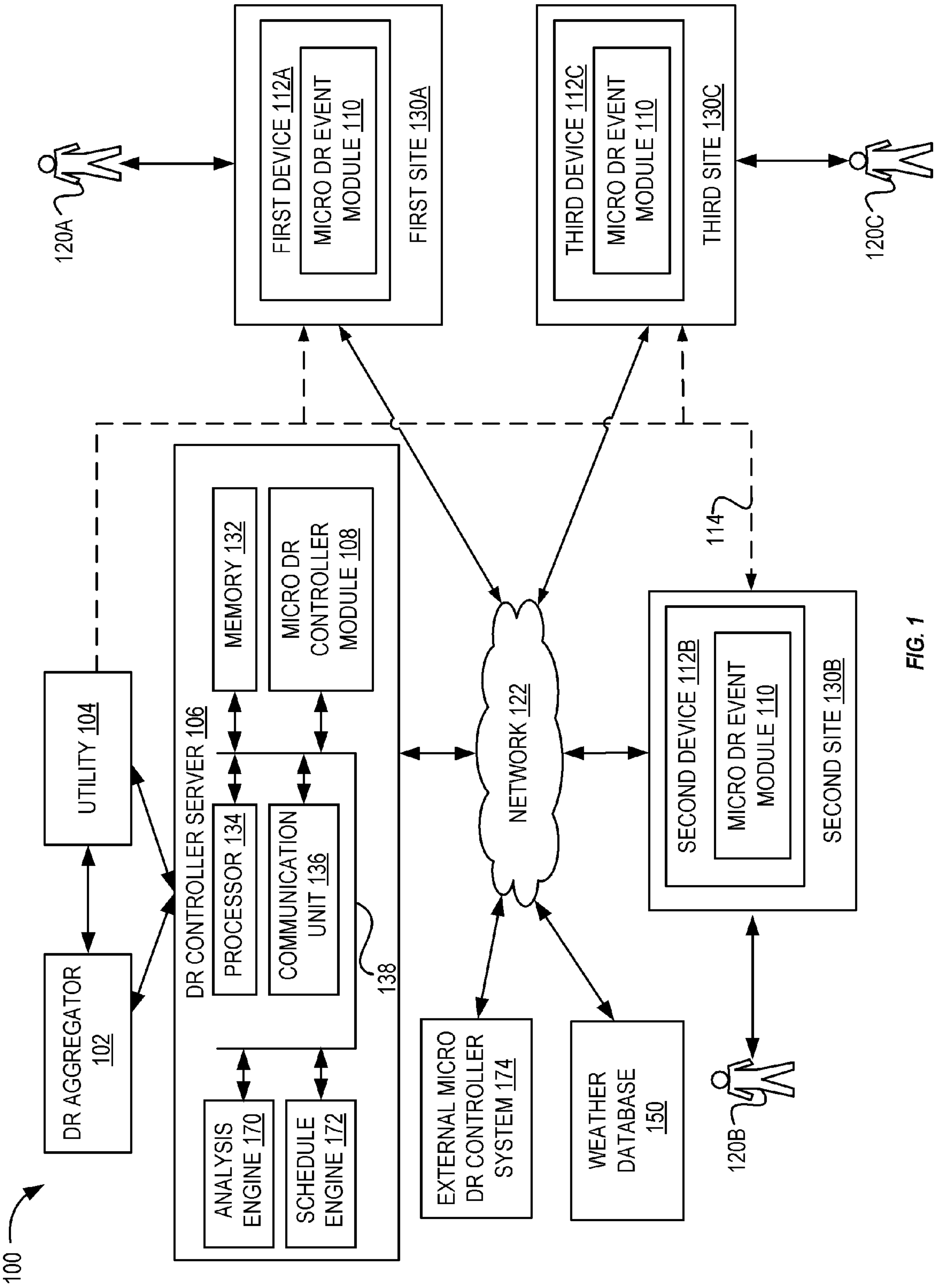
FIG. 1 is a block diagram of an example demand response (DR) system.

Demand response (DR) events generally include periods in which a utility and/or a DR aggregator curtail or incentivize curtailment of energy usage. For instance, DR events may be implemented when energy prices provide a motive to curtail energy. In some circumstances such as DR systems implementing direct load control (DLC) programs, instead of executing a single DR event, multiple micro DR events may be executed to achieve an equivalent energy curtailment. The micro DR events may include state transitions (e.g., On-to-Off or Off-to-On) of one or more devices to which energy is supplied.

The state transitions of the micro DR events may be scheduled according to one or more factors. For example, the devices may include heating, ventilation, and air conditioning (HVAC) systems, each HVAC system may be a single-unit system or a system that that includes separate heating, ventilation, and air conditioning units operating to provide an overall HVAC system. The state transitions of the HVAC systems may be scheduled such that a temperature of a site serviced by the HVAC system is maintained, which may reduce a likelihood that the customer is aware of the state transitions. Additionally, the state transitions may be scheduled such that the HVAC systems or other devices are not damaged. For example, some HVAC systems or other cycling devices have a minimum-time-off (min off) constraint and a minimum-time-on (min on) constraint. Compliance with the min off and the min on constraints may reduce wear on the HVAC systems.

Accordingly, some embodiments described herein include a method of micro DR scheduling. In these and other embodiments, the scheduling may be separated into two operations. A first of the operations may include generating a duty cycle expression, such as a duty cycle equation. The duty cycle expression may be generated for one or more devices configured for participation in a DR event. In embodiments in which the devices include the HVAC systems, the duty cycle expression may be based on a thermal model, which may be specific to a site in which the HVAC system is located or services.

A second of the operations may include a scheduling operation. Generally, the scheduling operation includes identifying which of the devices to include in the micro DR event and determining when the identified devices cycle off and a duration during which the identified devices are cycled off. The identification of which of the devices to include in the micro DR event may be based on curtailed loads and uncurtailed loads of the devices. Additionally, when the identified devices cycle off and a duration during which the identified devices are cycled off may be selected such that curtailments of the devices are spread out as evenly as possible during a micro DR event duration. Additionally, the duration during which the identified devices are cycled off may be adjusted to stratify the min off and min on constraints. These and other embodiments are described herein with relation to the appended figures.

FIG. 1 is a block diagram of an example DR system 100, arranged in accordance with at least one embodiment described herein. In the DR system 100, a utility 104 and/or a DR aggregator 102 may implement or control implementation of a DR event through execution of one or more micro DR events. The DR event is distinguished herein from the micro DR event in that the DR event includes a series and/or sequence of micro DR events. In this application, the DR event is sometimes referred to as a macro DR event. Again, the macro DR event may include a series and/or sequence of micro DR events. Some additional details of relationships between the micro DR events and the (macro) DR events are provided elsewhere herein.

The micro DR events may involve one or more devices 112A-112C (generally, device 112 or devices 112) located at one or more sites 130A-130C (generally, site 130 or sites 130). In some embodiments, the devices 112 may be a subset of devices and/or sites (e.g., 112 and/or 130) to which the utility 104 supplies energy and/or is managed by the DR aggregator 102. The devices 112 may be configured for participation in DR events while one or more other devices and/or sites that are not included in the collection of the devices 112 may not be configured for participation in DR events.

Generally, a (macro) DR event may include a DR duration during which energy usage is curtailed. An example of the DR duration may include a time period on a particular date or across multiple dates, such as from 3:00 PM on Jan. 1, 2014 until 5:00 PM on Jan. 1, 2014. Additionally, the DR event may include a total curtailment, which may include a total curtailment during the DR event. An example of a total curtailment may include one megawatt-hour (MWh). The total curtailment may include a sum of curtailments by participating sites (e.g., the sites 130) and/or participating devices (e.g., 112). Accordingly, an example DR event may include a DR duration from 3:00 PM on Jan. 1, 2014 until 5:00 PM on Jan. 1, 2014. During the DR duration, the utility 104 and/or the DR aggregator 102 may coordinate the curtailment of one MWh in aggregate energy curtailment by the devices 112 and/or the sites 130.

In the DR system 100, rather than issuing one DR event with a DR duration and a total curtailment in which operation of the devices 112 is affected (e.g., ceased or reduced), the utility 104 and/or the DR aggregator 102 may issue two or more micro DR events. Each of the micro DR events may include a micro DR duration. For instance, if the DR duration is about four hours, the DR duration may be separated into eight micro DR durations of about 30 minutes each. A sum of the micro DR durations may substantially equal the DR duration, may be greater than the DR duration, or may be less than the DR duration. Additionally, in some embodiments, the micro DR duration may not necessarily relate to the DR duration. Instead, micro DR durations may be related to a cycling period.

For example, during the micro DR duration, operation of a first set of the devices 112 is ceased or reduced for some time, which may be referred to herein as a curtailment duration or a curtailment period. In addition, operation of a second set of the devices 112 is not initially affected. The operation of the devices 112 that is ceased or reduced may be returned to an operational or fully operational state. Additionally, operation of the devices 112 that is not initially affected may be subsequently ceased or reduced.

The micro DR event may be scheduled such that one or more of the devices 112 has assigned to it a curtailment start time and a curtailment duration. Additionally, the micro DR event may be scheduled according to a cycling period. The cycling period includes a time period designated for the devices 112 included in a DR event. Generally, the cycling period may be multiple minutes. An example cycling period may be about fifteen minutes to about thirty minutes for HVAC systems.

During the cycling period, the curtailment durations of the devices 112 may be scheduled. For example, during the cycling period, operation of the devices 112 may cease or be reduced and may return to an operational or fully operational state. A DR event and/or a micro DR event may include one or more cycling periods or a fraction of a cycling period. In circumstances in which the DR event includes multiple cycling periods, the schedule of the curtailment durations of the devices 112 may be repeated for each of the cycling periods. Because the curtailment durations are scheduled according to the cycling period, it may not be necessary to know the DR duration a priori.

In some embodiments, the devices 112 included in one or both of the first set and the second set of the devices 112 may be changed between subsequent micro DR events and/or between micro DR events in a series of micro DR events. In other embodiments, the devices 112 included in the first and the second sets of the devices 112 may be consistent throughout the series of micro DR events. Additionally, over time (e.g., between DR events or conditions in which DR events may be issued) the devices 112 included in one or both of the sets may be changed.

Ceasing or reducing operation of the devices 112 may curtail a particular curtailment amount. A sum of the particular curtailment amounts of the series of micro DR events may be substantially equal to the total curtailment. Thus, the utility 104 and/or the DR aggregator 102 may achieve the total curtailment by issuing the micro DR events.

A benefit of the micro DR events may include a perceived reduction in interruption of the operation of the devices 112. For example, by periodically (e.g., intermittently according to the curtailment durations) interrupting operation, the overall function of one or more of the devices 112 may not be affected. Similarly, one or more of the devices 112 may be included in a subset of a series of micro DR events without necessarily being included in another of the series of micro DR events. Thus, the utility 104 and/or the DR aggregator 102 may achieve a total curtailment by distributing curtailment among a large number of the devices 112, which may reduce perception of the curtailment by customers (e.g., 120).

In the DR system 100 of FIG. 1, a DR controller server (DR server) 106 may communicate with the devices 112 via a network 122 to schedule and execute the micro DR events. The utility 104 and/or the DR aggregator 102 may be associated with the DR server 106. The sites 130 and/or the devices 112 may be associated with customers 120A-120C (generally, customer 120 or customers 120). The term "associated with," when used herein may refer to a relationship between the DR aggregator 102 and/or the utility 104 and the DR server 106 or between the customers 120 and the sites 130 and the devices 112, and/or may indicate ownership and/or control, directly or indirectly. For example, information communicated from the DR server 106 may be controlled by the utility 104 and/or the DR aggregator 102, and information communicated to the DR server 106 may be intended for the utility 104 and/or the DR aggregator 102. Additionally, the DR system 100 may include an external micro DR controller system (external controller system) 174 and a weather database 150. Each of these entities and systems are briefly introduced in the following paragraphs.

The network 122 may include a wired or wireless network, and may have any suitable configuration, such as a star configuration, a token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

In the DR system 100, the utility 104 may distribute energy, which may include electricity, to the sites 130 and the devices 112. The distribution of the energy by the utility 104 to the sites 130 and the devices 112 is denoted in FIG. 1 at 114. The utility 104 may include any entity involved in production, transmission, and/or distribution of electricity. The utility 104 may be publicly owned or may be privately owned. Some examples of the utility 104 may include a power plant, an energy cooperative, and an independent system operator (ISO). The utility 104 may set terms for the micro DR events. For example, the utility 104 may set an incentive, a micro DR duration, a total curtailment, a curtailment margin (discussed elsewhere herein), and the like.

The sites 130 may include buildings, structures, equipment, or other objects that use energy distributed by the utility 104. The sites 130 may include multiple types of structures ranging from private residences to large industrial factories or office buildings. In some embodiments, the sites 130 included in the DR system 100 may include residences and/or small- and medium-size business (SMB) sites.

The sites 130 may include the devices 112. The devices 112 may include any device or system that consumes energy distributed by the utility 104 to the sites 130. Additionally or alternatively, the devices 112 may control operation of a device or system that consumes energy distributed by the utility 104.

For instance, the utility 104 may distribute energy to a first site 130A. A first device 112A may then consume the energy distributed to the first site 130A. Additionally or alternatively, the first device 112A may control consumption of the energy distributed by the utility 104 by another device. The first device 112A may affect operation of the other device such that the other device consumes (or does not consume) the energy distributed to the first site 130A. The devices 112 may include memory (e.g., a memory 132 described herein), a processor (e.g., a processor 134 described herein), and network communication capabilities (e.g., a communication unit 136 described herein).

The devices 112 may include a micro DR event module 110. The micro DR event module 110 may include code and routines configured for implementation of micro DR events as described herein. In some embodiments, the micro DR event module 110 may be implemented using hardware including, for example, a field-programmable gate array (FPGA) or an application-specific integrated circuit (ASIC). In some other instances, the micro DR event module 110 may be implemented using a combination of hardware and software.

The micro DR event module 110 may be configured to receive and implement communications received via the network 122 and/or communicate signals related to the devices 112 via the network 122. For example, a signal communicated from the DR server 106 to transfer state may be implemented at the device 112 by the micro DR event module 110. Additionally or alternatively, the micro DR event module 110 may communicate a confirmation signal to the DR server 106 following a change of state. Moreover, the micro DR event module 110 may be configured to communicate or enable access to telemetry data from the devices 112. The telemetry data may include operational states, temperature readings or measurements, ambient condition measurements, date, time, setpoints, and the like. The telemetry data may be communicated via the network 122 to one or more of the weather database 150, the micro DR controller module 108, and the external controller system 174.

In some embodiments, the micro DR event module 110 may include routines configured to respond to signals sent in a DLC program. In a DLC program, the DR server 106 may directly control state transitions of the device 112. In other embodiments, the micro DR event module 110 may be configured to implement other types of DR programs.

The DLC program and/or the telemetry data may be configured to operate using OpenADR. OpenADR is an international standard for DR. The OpenADR may be implemented at one or more of the weather database 150, the micro DR controller module 108, and the external controller system 174.

Generally, the devices 112 may include or control a cycling device or a cycling system. An example of a cycling system may include HVAC systems. The HVAC systems may include air condition units, heaters, thermostats, fans, ventilation units, and other HVAC system equipment. Some other examples of the devices 112 may include a water heater, a piece of commercial or industrial equipment, a smart appliance, a controller for a piece of equipment, a pool heater, a household appliance, a refrigerator, a fan, a freezer, a thermostatically controlled unit, an appliance charging device, an electric vehicle charging device, a pool pump, and the like.

The customers 120 may include individuals, groups of individuals, or other entities. The sites 130 and the devices 112 may be associated with the customers 120. For example, a first customer 120A may be associated with the first site 130A and the first device 112A and a second customer 120B may be associated with a second site 130B and a second device 112B, etc. In some embodiments, the customers 120 may determine whether to participate in micro DR events and/or under what conditions a micro DR event may include a particular device 112. In other embodiments, the customers 120 may agree in advance to participate in or allow curtailment of the devices 112 in the micro DR events.

In embodiments in which the customers 120 have agreed to participate in the DR events, a condition of such participation may include a maximum curtailment duration. The maximum curtailment duration may include a maximum time that operation of the device 112 may be reduced or ceased.

The DR aggregator 102 may include an entity that acts as an intermediary between the utility 104 and the sites 130 and/or the customers 120. An example of the role as the intermediary may include coordination and implementation of the micro DR events. For example, the DR aggregator 102 may coordinate the customers 120 such that total curtailment amounts may be achieved during one or more micro DR events. In addition, the DR aggregator 102 may identify the sites 130 and/or the customers 120 to include in the DR system 100. In some embodiments, criteria of the micro DR events and/or an incentive offered by the utility 104 may be communicated to the DR aggregator 102. The DR aggregator 102 may in turn communicate the criteria to the customers 120 and/or the sites 130 and offer some portion of the incentive to the sites 130 in exchange for participation in the micro DR events.

The sites 130 may be managed by the DR aggregator 102. The DR aggregator 102 may coordinate implementation of, or implement via the DR server 106, the micro DR events by the devices 112 it manages. In the depicted embodiment, the DR aggregator 102 may act as an intermediary as described above. In some embodiments, the DR aggregator 102 may be omitted and the utility 104 may directly implement the micro DR events via the DR server 106.

The weather database 150 may include a system or entity that stores and monitors weather data. For example, the weather database 150 may include a public repository that tracks weather patterns in geographic locations relevant to the sites 130. The weather data may be access via the network 122 from the weather database 150.

The DR server 106 may include a hardware server that includes the processor 134, the memory 132, the communication unit 136, a micro DR controller module (controller module) 108, an analysis engine 170, and a schedule engine 172. The processor 134, the memory 132, the communication unit 136, the controller module 108, an analysis engine 170, and a schedule engine 172 may be communicatively coupled by a bus 138.

The processor 134 may include an arithmetic logic unit (ALU), a microprocessor, a general-purpose controller, or some other processor or processor array to perform one or more operations described herein. The processor 134 may be coupled to the bus 138 for communication with the other components (e.g., 108, 132, and 136). The processor 134 generally processes data signals. The processor 134 may include various computing architectures including a complex instruction set computer (CISC) architecture, a reduced instruction set computer (RISC) architecture, or an architecture implementing a combination of instruction sets. Although the DR server 106 of FIG. 1 includes a single processor 134, multiple processors may be included in the DR server 106 in which the multiple processors may be configured to collectively or individually perform the operations of the DR server 106.

The memory 132 may be configured to store instructions and/or data that may be executed by the processor 134. The memory 132 may be coupled to the bus 138 for communication with the other components. The instructions and/or data may include code for performing the techniques or methods described herein. The memory 132 may include Dynamic Random Access Memory (DRAM), Static RAM (SRAM), flash memory, or any other applicable type of memory. In some embodiments, the memory 132 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 136 may be configured to transmit data to and receive data from the devices 112. The communication unit 136 may be coupled to the bus 138. In some embodiments, the communication unit 136 may include a port for direct physical connection to the network 122 or to another communication channel. For example, the communication unit 136 may include a universal serial bus (USB), standard definition (SD), CAT-5, or similar port for wired communication with the devices 112. In some embodiments, the communication unit 136 includes a wireless transceiver for exchanging data via communication channels using one or more wireless communication methods, including IEEE 802.11, IEEE 802.16, BLUETOOTH®, or another suitable wireless communication method.

In some embodiments, the communication unit 136 includes a cellular communications transceiver for sending and receiving data over a cellular communications network including via SMS, MMS, HTTP, direct data connection, WAP, e-mail, or another suitable type of electronic communication. In some embodiments, the communication unit 136 includes a wired port and a wireless transceiver. The communication unit 136 may also provide other conventional connections to the network 122 for distribution of files and/or media objects using standard network protocols including transmission control protocol/internet protocol (TCP/IP), HTTP, HTTP secure (HTTPS), and simple mail transfer protocol (SMTP), etc.

In the DR system 100, the controller module 108 of the DR server 106 may be configured to execute one or more micro DR events. Execution of the micro DR events may include signaling the devices 112 to perform state transitions (e.g., On-to-Off and Off-to-On). More generally, signaling by the DR server 106 may cause state transitions of one or more of the devices 112 from a current state to an alternative state. For example, the first device 112A may be in an On state (e.g., operating), which may be a current state of the first device 112A. The second device 112B may be in an Off state (e.g., not operating), which may be a current state of the second device 112B. A state transition of the first device 112A may transition the first device 112A to an Off state (e.g., not operating) such that the first device 112A performs an On-to-Off transition. Similarly, a state transition of the second device 112B may transition the second device 112B to an On state (e.g., operating) such that the second device 112B performs an Off-to-On transition. In some embodiments, the signaling may be formatted according to OpenADR.

The controller module 108 may be further configured to receive telemetry data from the devices 112. The controller module 108 may parse or otherwise process the telemetry data. The controller module 108 may communicate the telemetry data or some portion thereof to the weather database 150. The telemetry data may be formatted according to OpenADR.

The external controller system 174 may be configured to perform one or more operations attributed herein to the controller module 108. The external controller system 174 may simply perform one or more of such operations remote to the DR server 106. In some embodiments, the DR system 100 may omit the external controller system 174 or the controller module 108.

The analysis engine 170 may be configured to generate device models and duty cycle expressions, such as duty cycle equations, based thereon. The device models and the duty cycle equations may be based on telemetry data and/or weather data. In embodiments in which the devices 112 include HVAC systems, the analysis engine 170 may read thermostat data that may be included in the telemetry data and weather data from the weather database 150. The analysis engine 170 may construct the thermal models for the HVAC systems for each of the sites 130.

The schedule engine 172 may be configured to read data from the weather database 150 and receive device models from the analysis engine 170. Additionally, the schedule engine 172 may receive curtailment requests from the utility 104 and/or the DR aggregator 102. Based on the data read from the weather database 150, the device models, and the curtailment requests, the schedule engine 172 may compute a schedule for state transitions of the devices and may generate transition signals configured to transition the state of the devices 112 during a micro DR event. The transition signals may be communicated to the controller module 108 or the external controller system 174 for dispatch to the devices 112.

In the DR system 100 of FIG. 1, the utility 104 may distribute energy to the sites 130. Accordingly, the micro DR events described with reference to FIG. 1 may include curtailment of electrical energy usage by the sites 130 and/or the devices 112. In some other embodiments, the utility 104 may provide another resource such as natural gas or water to the sites 130. Thus, in these other embodiments, the micro DR events may include curtailment of other resources other than electricity. Moreover, in these and other embodiments, the devices 112 may include the devices 112 that may use another resource and accordingly may be curtailed from use during micro curtailment events.

Modifications, additions, or omissions may be made to the DR system 100 without departing from the scope of the present disclosure. Specifically, FIG. 1 includes three customers 120, one DR server 106, one DR aggregator 102, one utility 104, one weather database 10, one external controller system 174, and three sites 130 that each includes one device 112. The present disclosure may apply to DR systems that may include one or more of the customers 120, one or more of the utilities 104, one or more of the DR aggregators 102, one or more of the DR servers 106, one or more weather database 10, one or more external controller system 174, one or more of the sites 130 that each include one or more of the devices 112, or any combination thereof. The present disclosure may also apply to DR systems in which energy or any other resource may be curtailed.

Moreover, the separation of various components in the embodiments described herein is not meant to indicate that the separation occurs in all embodiments. It may be understood with the benefit of this disclosure that the described components may be integrated together in a single component or separated into multiple components.

Figure 2:
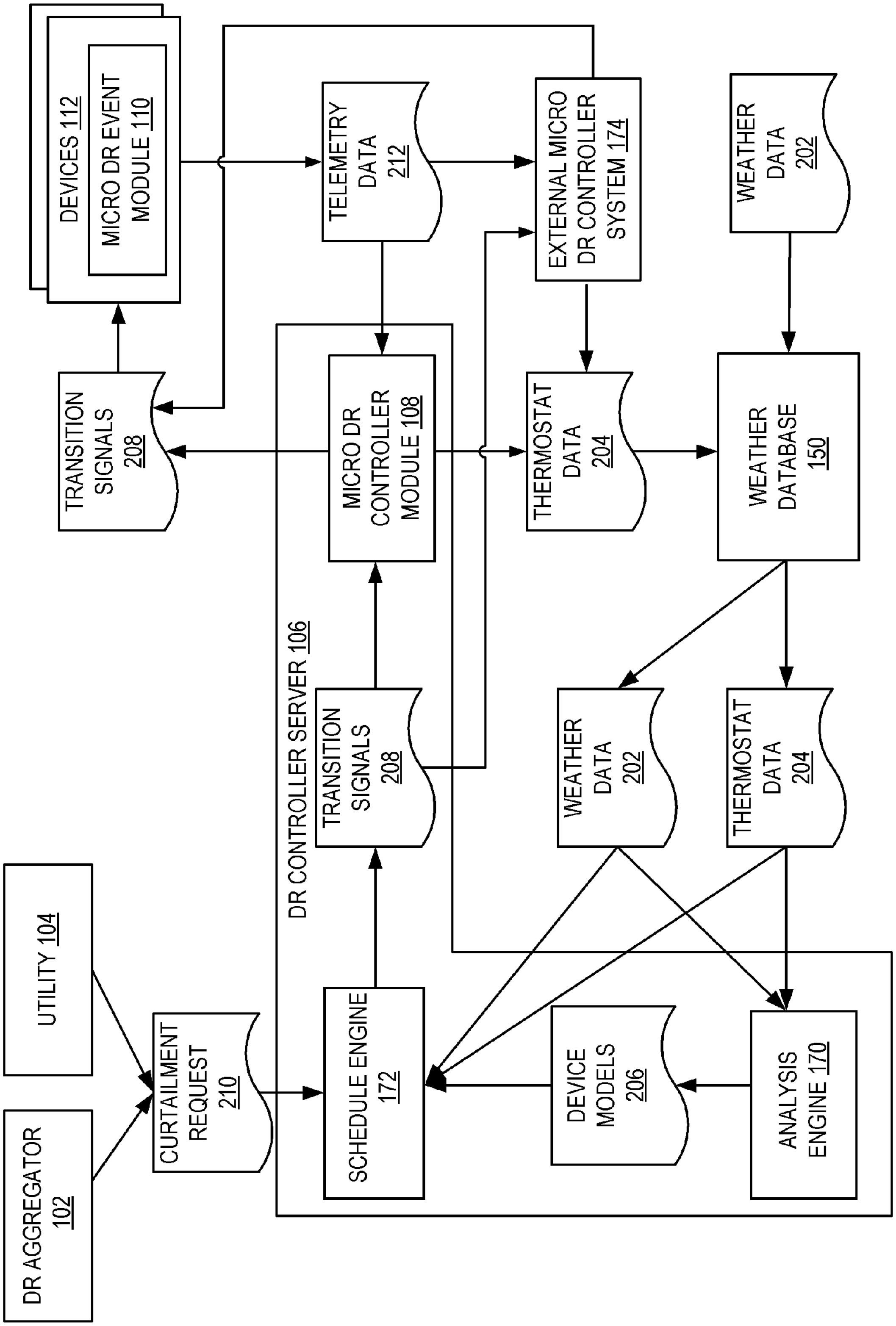
FIG. 2 illustrates an example of micro DR scheduling that may be implemented in the DR system of FIG. 1.

FIG. 2 illustrates an example of micro DR scheduling that may be implemented in the DR system 100 of FIG. 1. The micro DR scheduling of FIG. 2 represents an example of micro DR scheduling for embodiments in which the device 112 includes an HVAC system. The example micro DR scheduling may be substantially similar for embodiments in which the device 112 includes other types of devices or systems.

FIG. 2 includes the DR aggregator 102, the utility 104, the DR server 106, the device 112, the external controller system 174, and the weather database 150 of FIG. 1. The network 122 is omitted from FIG. 2. However, it may be appreciated with the benefit of this disclosure that communications depicted in FIG. 2 may be facilitated via the network 122 described with reference to FIG. 1.

The example micro DR event scheduling of FIG. 2 may be based on telemetry data 212, which may be communicated or accessed from the device 112. The telemetry data 212 may be received or accessed by the controller module 108 and/or the external controller system 174. The telemetry data 212 may include thermostat data 204, which may be communicated from the controller module 108 and/or the external controller system 174 to the weather database 150. The thermostat data 204 may include, for example, an indoor temperature of a site (e.g., the site 130 of FIG. 1) implementing the device 112, a setpoint, an identifier, and an operating mode of the device 112. The operating mode may include for example, "OFF" when the device 112 is not operating and "COOL" when the device 112 is operating in a cooling mode. Additionally, the thermostat data 204 may include a timestamp that indicates the date and time of the thermostat data 204.

The weather data 202 may be stored at the weather database 150. The weather data 150 may be provided to the weather database 150 by a public or private weather monitoring entity. The weather data 202 may include ambient conditions and a timestamp. The ambient conditions may include an outdoor temperature at a site including the device 112, a solar radiation measure at a site including the device 112, as well as other ambient conditions such as humidity, barometric pressure, wind speed/direction, precipitation, and the like. The weather data 202 may include a timestamp that indicates the data and time of the weather data 202.

In some embodiments, the weather data 202 may be formatted as (timestamp, outdoor temperature, solar radiation, first additional ambient condition . . . final additional ambient condition). Additionally or alternatively, the thermostat data may be formatted as (timestamp, thermostat id, indoor air temperature, setpoint, operating mode).

The analysis engine 170 may read the thermostat data 204 and the weather data 202 and generate a duty cycle expression and/or a thermal model based thereon. The thermal model and the duty cycle expression provide the duty cycle of the device that maintains a temperature at a site including the device 112. The duty cycle generally refers to an average percentage of time the device 112 is in an On state. FIG. 2 includes one device 112, for which the analysis engine 170 generates a duty cycle expression and/or thermal model. In embodiments including multiple devices, the analysis engine 170 may generate a duty cycle expression and/or thermal model for one, more, or each of the devices 112.

The analysis engine 170 may generate the duty cycle expression for the devices 112 based on one of two thermal models. A first thermal model provides device duty cycles indirectly via approximating a physical thermal dynamics of the site. The first thermal model estimates an indoor air temperature at a particular future time based on a sequence of controls executed on an operating state of the device 112 and a sequence of the weather data 202. The duty cycle of the device 112 that maintains the indoor air temperature at a particular value may be calculated from the estimated indoor air temperature at the particular future time.

In an example of the first thermal model, the device 112 may include an HVAC system including an Off state and an On state in which the HVAC system is cooling. Additionally, the only significant ambient condition included in the weather data 202 includes outdoor temperature. In this example, the first thermal module may be defined according to a first thermal model expression:

$$\theta_{in}(t_{k+1}) = \theta_{out}(t_k) + (\theta_{in}(t_k) - \theta_{out}(t_k))e^{-a\delta_k} + + \frac{c}{a}(1 - e^{-a\delta_k}) - \frac{b}{a}(1 - e^{-a\delta_k})u(t_k)$$

In the first thermal model expression, the parameter $t_k$ represents a sampling time of a data point represented by an indexing variable k. The parameter $\delta_k$ represents a sampling interval from a kth to a (k+1)th data point (e.g., sampling interval from $t_{k+1}-t_k$). The parameter $\theta_{in}(t_k)$ represents an indoor air temperature on a thermostat at the time $t_k$. The parameter $\theta_{out}(t_k)$ represents an outdoor temperature at the time $t_k$. The parameter $u(t_k)$ represents a duty cycle of a corresponding device 112. In some embodiments, the duty cycle equation may returns one if the HVAC system is in an On state at the time $t_k$ and returns zero if the HVAC system is in the Off state at the time $t_k$. The parameters a, b, and c are model parameters.

The analysis engine 170 solves for model parameters. Generally, the model parameters may be influenced by heat insulation of the site, usage of devices (e.g., oven, dryer, etc.) in the site, and occupancy level of the site. The model parameters may be different for one or more days of the week. In addition, the model parameters may be estimated based on the model parameters from the same day of the previous week.

To solve for the model parameters, the analysis engine 170 may perform a regression analysis on a simplified version of the first thermal model expression. An example of a simplified first thermal model expression may be represented by:

$$\delta = t_{k+1} - t_k \text{ for every } k$$

$$\theta_{in}(t_{k+1}) = \theta_{out}(t_k) + \alpha(\theta_{in}(t_k) - \theta_{out}(t_k)) + \gamma - \beta u(t_k)$$

In the simplified thermal model expressions, the parameters other than α, β, and γ (e.g., $\theta_{in}(\ )$, $\theta_{out}(\ )$, $t_k$, and $u(\ )$) are as described above. The parameters α, β, and γ represent model parameters for the simplified first thermal model. To simplify the first thermal model, data used includes evenly spaced interval, which is represented by $\delta = t_{k+1} - t_k$. From the simplified first thermal model expression, the model parameters may be solved for linear regression techniques using a linear model and/or a best-fit value.

A duty cycle equation may be derived from the simplified first thermal model expression. For example, to estimate a duty cycle that maintains an indoor air temperature at a particular value, the particular value may be substituted for the indoor air temperature on a thermostat at a time. Accordingly, the duty cycle equation may be solved for as:

$$u = \frac{(1 - \alpha)(\theta_{out} - \theta_{in}) + \gamma}{\beta}$$

In the duty cycle equation, u represents a duty cycle of a corresponding device as described above and the other parameters are as described above.

The second thermal model may provide device duty cycles directly via a statistical model for the device 112 based on a sequence of the weather data 202. The second thermal model estimates the duty cycle of the device 112 that maintains the indoor air temperature at a particular value given the sequence of the weather data 202.

In an example of the second thermal model, the device 112 may include an HVAC system including an Off state and an On state in which the HVAC system is cooling. Additionally, the only significant ambient condition included in the weather data 202 includes outdoor temperature. In this example, the second thermal module may be defined according to a second thermal model expression:

$$u = a\theta_{in} + b\theta_{out} + c$$

In the second thermal model expression, u represents the duty cycle of a corresponding device 112. The parameter u may returns a one in response to the device 112 being in an On state at a time and that returns a zero in response to the HVAC system being in an Off state at the time. The parameter $\theta_{in}$ represents an indoor air temperature on thermostat at a time. The parameter $\theta_{out}$ represents outdoor temperature at a time. The parameters a, b, and c represent model parameters for the second thermal model expression. The model parameters for the second thermal model expression may be different from the model parameters of the first thermal model expression. The model parameters for the second thermal model expression may be computed by the analysis engine 170 by a linear regression technique. In some embodiments, the second thermal model may be extended to allow for nonlinear terms in the indoor air temperature and the outdoor temperature (e.g., $\theta_{out}^2$ and $\theta_{in}^2$).

The device models 206 and/or the duty cycle expressions may be communicated to the schedule engine 172. The schedule engine 172 may receive the device models 206, the weather data 202, and the thermostat data 204. Additionally, the schedule engine 172 may receive a curtailment request 210 from the DR aggregator 102 and/or the utility 104. Based on the device models 206, the weather data 202, the thermostat data 204, the curtailment request 210 or some combination thereof, the schedule engine 172 may schedule periods in which the device 112 is in an Off state (e.g., curtailment durations) and in an On state (e.g., cooling the site).

In general, the periods may be scheduled such that one or more conditions are met. A first condition may include a minimum target curtailment is achieved for the (macro) DR event. In some embodiments, the baseline and target curtailment may be fixed at a beginning of the DR event and may not be revised during the event. A second condition may include an indoor air temperature does not exceed the consumer setpoint by a certain number of degrees. A third condition may include the min on and min off constraints are satisfied. A fourth condition may include the device 112 cycles once per cycling period, which may be chosen by the DR aggregator 102 and/or the utility 104. A fifth condition may include a total curtailment duration of the device 112 does not exceed a certain time specified by the DR aggregator 102 and/or the utility 104.

The schedule engine 172 may be configured to estimate a baseline cycling percentage. The baseline cycling percentage may include a cycling percentage of the device 112 that maintains an indoor temperature at a particular setpoint. The baseline cycling percentage may be based on a generated duty cycle expression. In some embodiments, the baseline cycling percentage may be estimated as a difference between one and the generated duty cycle expression in which the value of an indoor temperature parameter of the generated duty cycle expression is equated to the particular setpoint. For example, the baseline cycling percentage may be calculated according to a baseline cycling percentage expression:

$$\text{BaselineCycling}_i = 1 - (a_i\theta_{set,i} + b_i\theta_{out} + c_i)$$

In the baseline cycling percentage expression, BaselineCycling represents the baseline cycling percentage. The equation $a_i\theta_{set,i}+b_i\theta_{out}+c_i$ represents a duty cycling equation based on the second thermal model with $\theta_{in}$ being set to a $\theta_{set,i}$ that represents the particular setpoint. The baseline cycling percentage may be similarly calculated using a duty cycling expression based on the first thermal model.

The schedule engine 172 may be configured to estimate a curtailed cycling percentage. The curtailed cycling percentage may include a cycling percentage that maintains the indoor temperature of a site within a particular temperate interval of the particular setpoint. The curtailed cycling percentage may be estimated as a difference between one and the generated duty cycle expression in which the value of the indoor temperature parameter is equated to a sum of the particular setpoint and the particular temperate interval. For example, the baseline cycling percentage may be calculated according a curtailed cycling percentage expression:

$$\text{CurtailedCycling}_i = 1 - (a_i(\theta_{set,i} + \Delta) + b_i\theta_{out} + c_i)$$

In the curtailed cycling percentage expression, CurtailedCycling represents the curtailed cycling percentage. The equation $a_i(\theta_{set,i}+\Delta)+b_i\theta_{out}+c_i$ represents a duty cycling expression based on the second thermal model with $\theta_{in}$ being set to a $(\theta_{set,i}+\Delta)$, which represents a sum of the particular setpoint and the particular temperate interval. In embodiments in which the device 112 includes a capability to retrieve a current baseline cycling percentage, then the current baseline cycling percentage may be used to compute the curtailed cycling percentage using $\text{CurtailedCycling}_i = \text{BaselineCyling}_i - a_i\Delta$.

The schedule engine 172 may be configured to calculate a baseline-off-duration. The baseline-off-duration may include a duration in which the device 112 is in an off state during a normal operating cycle. The baseline-off-duration may be calculated according to baseline-off-duration expression:

$$\text{BaselineOffDuration}_i = \text{BaselineCycling}_i \times T$$

In the baseline-off-duration expression, the parameter BaselineOffDuration represents the baseline-off-duration. The parameter BaselineCycling represents the baseline cycling percentage. The parameter T represents the cycling period.

The schedule engine 172 may be configured to calculate a curtailed-off-duration. The curtailed-off-duration includes off-durations scheduled for curtailment purposes or that is implemented during a curtailment period. The curtailed-off-duration may be calculated according to curtailed-off-duration expression:

$$\text{CurtailedOffDuration}_i = \text{CurtailedCycling}_i \times T$$

In the curtailed-off-duration expression, the parameter CurtailedOffDuration represents the curtailed-off-duration. The parameter CurtailedCycling represents the curtailed cycling percentage. The parameter T represents the cycling period.

The schedule engine 172 may be configured to adjust the curtailed-off-duration and/or the baseline-off-duration. The schedule engine 172 may be configured to adjust the curtailed-off-duration and/or the baseline-off-duration to satisfy the min on and min off constraints.

In some embodiments, the schedule engine 172 may be configured to adjust the curtailed-off-duration and/or the baseline-off-duration according to adjustment expressions:

If $\text{X\_OffDuration}_i > T - t_{on}$:

choose a random number $r = \text{Uniform}[0, 1]$, then set $$\text{Adjusted\_X\_OffDuration}_i \begin{cases} T - t_{off} & \text{if } r \le \dfrac{T - \text{X\_OffDuration}_i}{t_{on}} \\ T & \text{if } r > \dfrac{T - \text{X\_OffDuration}_i}{t_{on}} \end{cases}$$

Else if $\text{X\_OffDuration}_i < t_{off}$:

choose a random number $r = \text{Uniform}[0, 1]$, then set $$\text{Adjusted\_X\_OffDuration}_i \begin{cases} t_{off} & \text{if } r \le \dfrac{\text{X\_OffDuration}_i}{t_{off}} \\ 0 & \text{if } r > \dfrac{\text{X\_OffDuration}_i}{t_{off}} \end{cases}$$

Else:

$$\text{Adjusted\_X\_OffDuration}_i = \text{X\_OffDuration}_i$$

In the adjustment expressions, X_OffDuration represents curtailed-off-duration or the baseline-off-duration. The Adjusted_X_OffDuration represents adjusted curtailed-off-duration or the adjusted baseline-off-duration, respectively. The parameter r represents a random number. The parameter $t_{on}$ represents a min on constraint of the device 112. The parameter $t_{off}$ represents a min off constraint of the device 112. The parameter T represents a cycling period. The function Uniform[0,1] represents a uniform distribution expression.

The schedule engine 172 may identify one or more devices 112 to include in a micro DR event. Identification of the devices 112 to include in the micro DR event may be based on an average curtailed load of the one or more devices 112 and an average uncurtailed load of the one or more devices 112. In some embodiments, the identifying the one or more devices 112 may include sorting one or more devices 112 by decreasing cooling demand. The devices 112 sorted according to decreasing cooling demand may be represented according to sorting expression:

$$d_1 > d_2 > d_3 > \ldots > d_N$$

In the sorting expression, d represents an estimated cooling demand of one of the devices 112. The parameter N represents a number of devices 112 that may be configured for participation in a DR event and an indexing variable of the estimated cooling demand of a device having the smallest cooling demand.

Additionally, identifying the devices 112 to include in the micro DR event may include calculating the curtailed average load for one or more of the devices 112. The curtailed average load may represent a load imposed by the device 112 when curtailed. The curtailed average load may be calculated according to a curtailed average load expression:

$$\text{Curtailed\_Average\_Load}_i = d_i \times \frac{AdjustedCurtailedOnDuration_i}{T}$$

In the curtailed average load expression, d is as discussed above. The parameter i is an indexing variable. The parameter T represents a cycling period. The parameter Curtailed_Average_Load represents an average curtailed load for a device. The AdjustedCurtailedOnDuration represents an adjusted curtailed-on-duration. In some embodiments, adjusted curtailed-on-duration may be a difference of T and the adjusted curtailed-off-duration, which may be calculated as described above.

Additionally, the identification of the devices 112 to include in the micro DR event may include calculating the uncurtailed average load. The uncurtailed average load may represent a load imposed by the device 112 when uncurtailed. The uncurtailed average load may be calculated according to a curtailed average load expression:

$$\text{Uncurtailed\_Average\_Load}_i = d_i \times \frac{AdjustedBaselineOnDuration_i}{T}$$

In the uncurtailed average load expression, d, i, and T are as discussed above. The parameter Uncurtailed_Average_Load represents an average uncurtailed load for a device. The AdjustedBaselineOnDuration represents an adjusted baseline-on-duration that may be equal to a difference between a cycling period and the adjusted baseline-off-duration calculated above.

Additionally, the identification of the devices 112 to include in the micro DR event may include determining a smallest number k that produces a true result from a device selection expression:

$$\left(\sum_{i=0}^{k} \text{Curtailed\_Average\_Load}_i + \sum_{i=k+1}^{N} \text{Uncurtailed\_Average\_Load}_i\right) < D$$

In the device selection expression, i, Curtailed_Average_Load, Uncurtailed_Average_Load, N, are as described above. The parameter D represents a target load. Generally, the device selection expression chooses the largest loads to curtail. In some embodiments, the identification of the devices 112 to include in the micro DR event may be based on another factor such as recentness of inclusion in a DR event.

The schedule engine 172 may then assign curtailment start times for one or more of the identified devices 112. The curtailment start time may be the time within the cycling period in which the device 112 is transitioned to an Off state.

In some embodiments, to assign a start time, the schedule engine 172 may determine whether there exists a specific start time that is non-zero and in which an aggregate curtailment envelope curve is monotonically decreasing over time. If such a specific start time exists for a device 112, then the schedule engine 172 sets the curtailment start time of the device 112 to the specific start time.

The "zero" curtailment start time represents the beginning of the cycling period. Accordingly in DR events including multiple cycling periods, there may be multiple "zero" curtailment start times, each of which occurs at the beginning of a cycling period.

Additionally, the schedule engine 172 may determine whether curtailing the device 112 extends temporally beyond a first cycling period. In response to the curtailing the device extending temporally beyond a first cycling period, the schedule engine 172 may assign an excess portion of a curtailment duration to begin at zero.

The schedule engine 172 may initialize an aggregate curtailment graph. The aggregate curtailment graph may be initialized to correspond to the cycling period. The curtailment start times may be included in the aggregated curtailment graph for multiple cycling periods until the DR event ends or the curtailment durations violate a contractual curtailment limitation of a customer or a device 112. Generally, the devices 112 having the largest cooling demands are assigned first, which along with the monotonicity condition, may ensure a variation in an aggregate curtailment envelope is less than a largest cooling demand.

Figure 3:
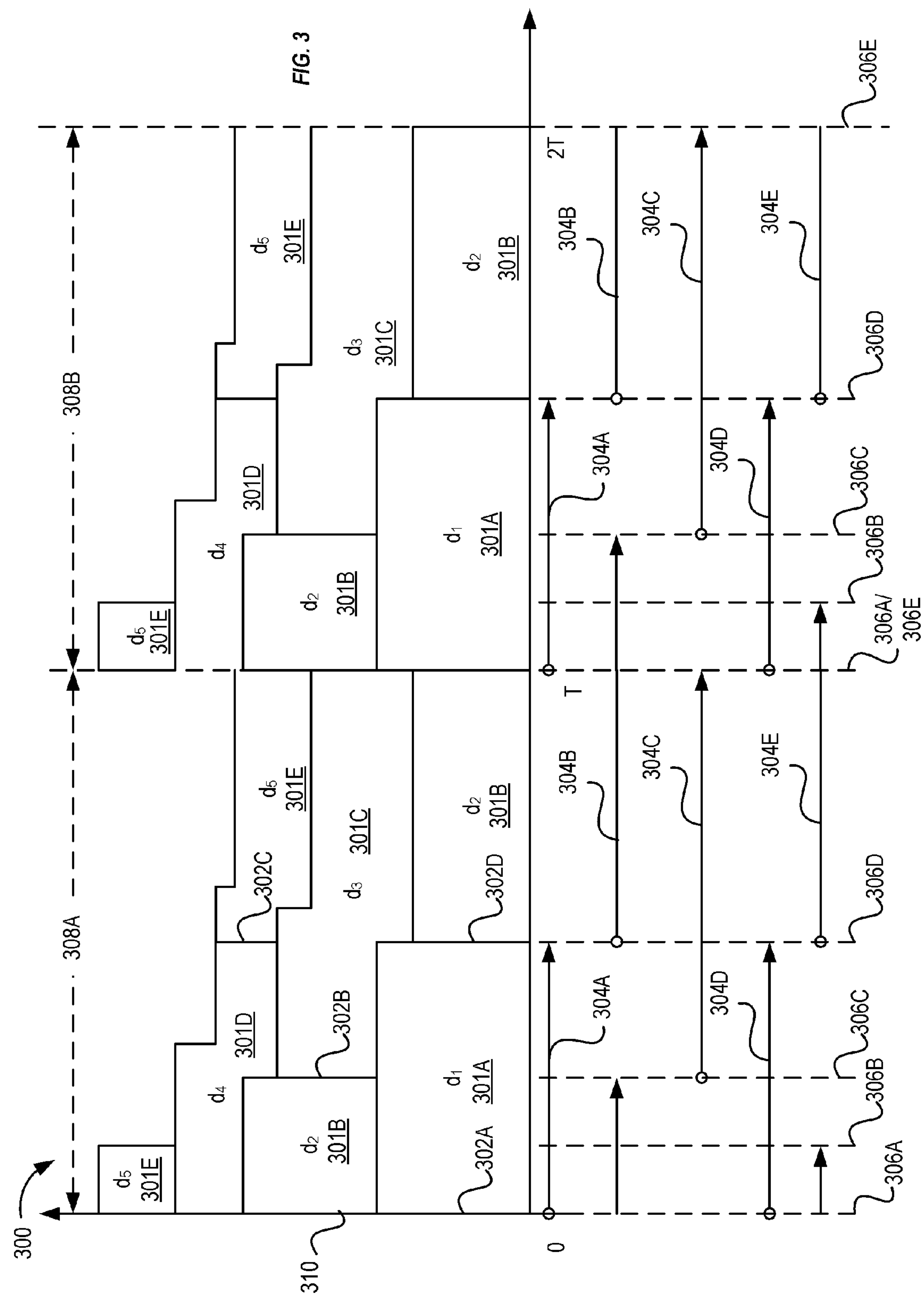
FIG. 3 illustrates an example aggregate curtailment graph that may be implemented in the DR system of FIG. 1.

With reference to FIG. 3, an example aggregate curtailment graph (graph) 300 that may be implemented in the DR system 100 of FIG. 1 is illustrated. Generally, the graph 300 depicts the aggregate curtailment of a set of devices, such as the devices 112 of FIGS. 1 and 2 that are identified for participation in a micro DR event. The graph 300 includes a plot of the curtailment start times 302A-302D within the cycling period (T in FIG. 3). Additionally, the graph 300 includes the curtailment durations 304A-304E of the devices.

In the example graph 300 of FIG. 3, two cycling periods 308A and 308B are included. The aggregate curtailment of five devices are depicted, each of which includes a curtailment start time 302A-302D and the curtailment duration 304A-304E. The start times 302A-302D and the curtailment durations 304A-304E are the same for both of the cycling periods 308A and 308B. Cooling demands $d_1$-$d_5$ (301A-301E) are included for each of the devices. In general, $d_1$ (301A)>$d_2$ (301B)>$d_3$ (301C)>$d_4$ (301D)>$d_5$ (301E).

As depicted in the graph 300, the aggregate curtailment of the devices monotonically decreases over time in each of the cycling periods 308A and 308B. For example, at time zero in a first cycling period 308A, a curtailment of $d_1$ (301A)+$d_2$ (301B)+$d_3$ (301C)+$d_5$ (301E) is occurring. The curtailment decreases until the beginning of a second cycling period 308B.

In FIG. 3, the curtailment durations 304A-304E are represented between datums 306A-306E (generally, datum 306). A first datum 306A occurs at time equal to zero, a final datum 306E occurs at time equal to the cycling period (T), and a second datum 306B, third datum 306C, and fourth datum 306D occur between the first datum 306A and 306E. The first datum 306A and the final datum 306E correspond between the cycling periods 308A and 308B. Each of the curtailment durations 304A-304E are represented by lines with a small circle at a datum 306 that corresponds to a curtailment start time 302A-302D and ends with an arrow.

For example, a first curtailment duration 304A begins at the first datum 306A and continues until the fourth datum 306D. The first curtailment duration 304A begins at a first start time 302A that corresponds to a time equal to zero. The second curtailment duration 304B begins at the fourth datum 306D and continues until the third datum 306C of the second cycling period 308B. The second curtailment duration 304B extends temporally beyond the first cycling period 308A. Thus, an excess portion, which is labeled 310 in FIG. 3, is assigned to begin at the curtailment start time 302A that is equal to zero. A fifth curtailment duration 304E is similar to the second curtailment duration 304B in that the fifth curtailment duration 304E also includes an excess portion.

In some circumstances, in which the curtailment durations include two cycling periods (e.g., the second and fifth curtailment durations 304B and 304E) and the excess portion begins at time zero, the initial portion of the curtailment duration 304B or 304D (starting at time zero) might violate the min off constraint (e.g., the device may not be in an Off state long enough). If this circumstance exists, the initial portion (e.g., 310) may be ignored.

Referring back to FIG. 2, the schedule engine 172 may communicate transition signals 208 to the controller module 108 and/or the external controller system 174. The transition signals 208 represent the curtailment start times assigned to the devices 112. The controller module 108 and/or the external controller system 174 may communicate the transition signals 208 to the devices 112 to execute a micro DR event in accordance with the curtailment start times assigned to the devices 112.

When the DR event has ended or a contractual curtailment limit is reached, the devices 112 may be reverted to the baseline cycling percentage. Reversion of the devices 112 may include performing one or more operations above for assigning the curtailment start times except the devices 112 may be set to be curtailed at the baseline cycling percentages. Reversion of the devices 112 to the baseline cycling percentage may return the load in a system (e.g., the DR system 100) to pre-DR event level.

For one or more of the devices 112, the controller module 108 and/or the external controller system 174 may release control in response to a setpoint temperature of the devices 112 and/or a dead band of the devices 112 being reached. Releasing control based on the setpoint may reduce "snapback" in a system. The snapback may occur when, following the DR event, all the devices 112 turn on within a short period of time.

In circumstances in which the DR duration extends past the contractual curtailment limit, the controller module 108 and/or the external controller system 174 may revert devices 112 to the baseline cycling percentages with no further control. Additionally, the schedule engine 172 may perform one or more operations for assigning the curtailment start times, but omit the devices 112 included in the immediately prior DR event or those customers (e.g., 102 from FIG. 1) whose contractual limit is reached.

In some embodiments, the DR server 106 may perform two or more DR events with overlapping durations. For example, a first DR event may include a first subset of the devices 112. The DR event may be implemented according to assigned curtailment start times of the first subset of the devices 112 as discussed herein. During implementation of the micro DR events included in the first DR event, a second curtailment request 210 may be received or another event may occur indicating an initiation of a second DR event. The schedule engine 172 may perform one or more operations for assigning the curtailment start times to a second subset of the devices 112 in response to the second curtailment request 210. The second subset of devices 112 may not include the first subset of the devices 112. During the operations for assigning the curtailment start times to the second subset of devices 112, the schedule engine 172 may simply omit the devices 112 from the first subset.

Figure 4A:
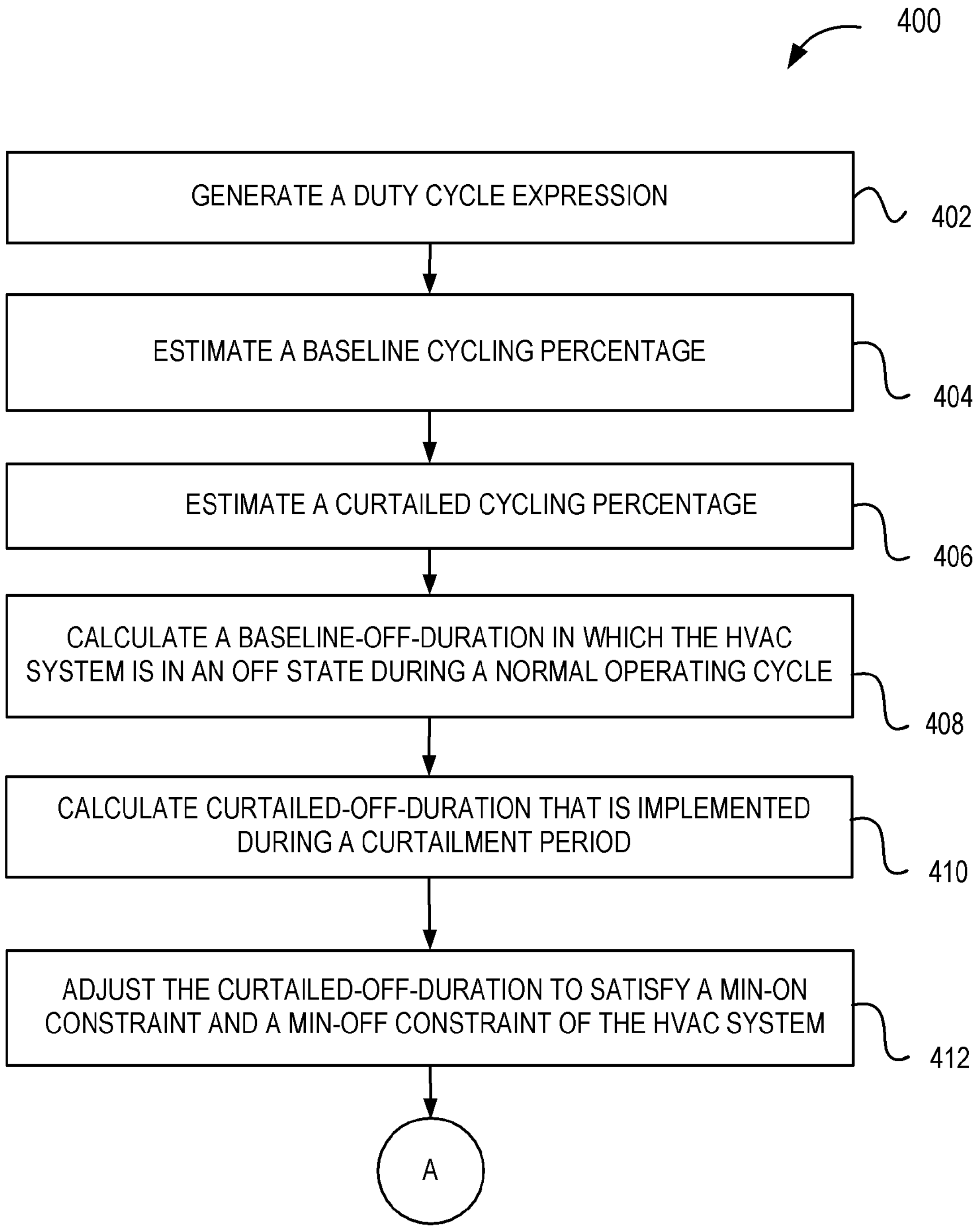
FIGS. 4A and 4B are a flow diagram of an example method of micro DR scheduling.
Figure 4B:
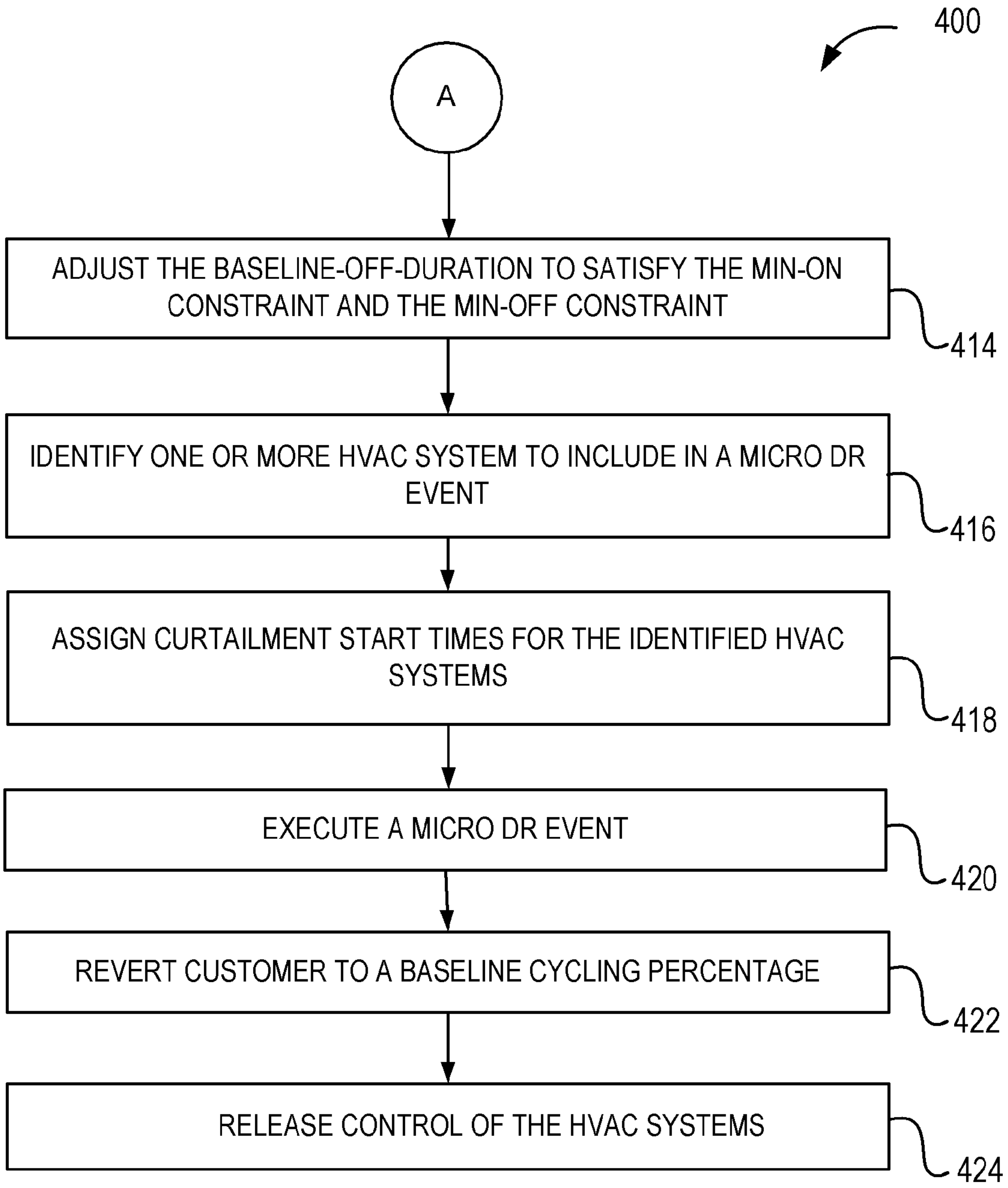

FIGS. 4A and 4B are a flow diagram of an example method 400 of micro DR scheduling, arranged in accordance with at least one embodiment described herein. Although illustrated as discrete blocks, various blocks may be divided into additional blocks, combined into fewer blocks, or eliminated, depending on the desired implementation. The method 400 is described with reference to an embodiment in which the devices are HVAC systems. The method 400 may be implemented in embodiments in which the devices include other types of devices.

The method 400 may begin at block 402, in which a duty cycle expression may be generated. The duty cycle expression may be generated for one or more HVAC systems or another device configured for participation in a DR event. The duty cycle expression may be generated according to a thermal model. In some embodiments, the thermal model may be configured to provide HVAC duty cycles indirectly. In these embodiments, the HVAC duty cycles may be provided via approximating a physical thermal dynamics of a site. The thermal module and/or the duty cycle expression may estimate an indoor air temperature at a particular future time based on a sequence of controls executed on an operating state of the HVAC system and a sequence of weather data.

In some embodiments, the duty cycle expression is generated according to a thermal module that provides HVAC duty cycles directly via a statistical model for the HVAC system based on a sequence of weather data.

At block 404, a baseline cycling percentage may be estimated. The baseline cycling percentage may be estimated that maintains an indoor temperature at a particular setpoint. The baseline cycling percentage may be based on the generated duty cycle expression. The baseline cycling percentage may be estimated as a difference between one and the generated duty cycle expression in which the value of an indoor temperature parameter of the generated duty cycle expression is equated to the particular setpoint.

At block 406, a curtailed cycling percentage may be estimated. The curtailed cycling percentage may include a cycling percentage that maintains the indoor temperature within a particular temperate interval of the particular setpoint. The curtailed cycling percentage may be estimated as a difference between one and the generated duty cycle expression in which the value of the indoor temperature parameter is equated to a sum of the particular setpoint and the particular temperate interval.

At block 408, a baseline-off-duration may be calculated in which the HVAC system is in an off state during a normal operating cycle. At block 410, a curtailed-off-duration may be calculated that is implemented during a curtailment period. At block 412, the curtailed-on-duration may be adjusted to satisfy a min-on constraint and a min-off constraint of the HVAC system. At block 414, the baseline-off-duration may be adjusted to satisfy the min-on constraint and the min-off constraint. At block 416, one or more HVAC systems to include in a micro DR event may be identified based on an average curtailed load of the one or more HVAC systems and an average uncurtailed load of the one or more HVAC systems.

At block 418, curtailment start times may be assigned for each of the identified HVAC systems. At block 420, a micro DR event may be executed according to the assigned curtailment start times. At block 422, each device may be reverted to the baseline cycling percentage. At block 424, control of the HVAC systems may be released. For example, the control of the HVAC systems may be released after the setpoint temperature is reached or a dead band of the setpoint temperature is reached.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
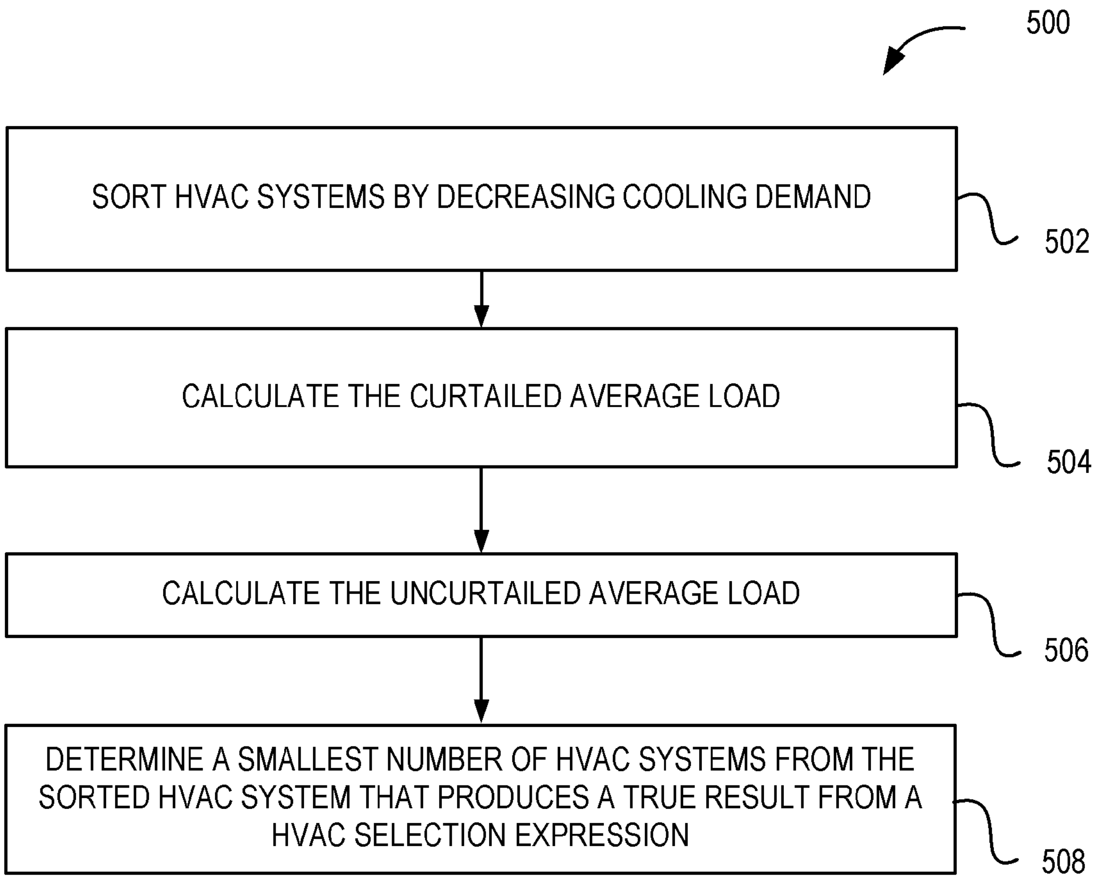
FIG. 5 is a flow diagram of an example method of identifying the one or more HVAC systems to include in a micro DR event.

FIG. 5 is a flow diagram of an example method 500 of identifying one or more HVAC systems to include in a micro DR event, arranged in accordance with at least one embodiment described herein. Although illustrated as discrete blocks, various blocks may be divided into additional blocks, combined into fewer blocks, or eliminated, depending on the desired implementation. The method 500 is described with reference to an embodiment in which the devices are HVAC systems. The method 500 may be implemented in embodiments in which the devices include other types of devices. In some embodiments, the method 500 is an example of block 416 of FIG. 4.

The method 500 may begin at block 502, in which HVAC systems may be sorted by decreasing cooling demand. For example, the HVAC systems may include any number of HVAC systems (or other types of devices). The HVAC system including the highest cooling demand may be sorted to be first, which may be followed by the HVAC system having the second-highest cooling demand, etc.

At block 504, for one or more of the HVAC systems, the curtailed average load may be calculated. The curtailed average load may be calculated as a cooling demand multiplied by an adjusted curtailed-on-duration divided by a cycling period. The adjusted curtailed-on-duration may be equal to a difference of T and an adjusted curtailed-off-duration.

At block 506, the uncurtailed average load may be calculated for one or more of the HVAC systems. The uncurtailed average load may be calculated as a cooling demand multiplied by an adjusted baseline-on-duration divided by a cycling period. The adjusted baseline-on-duration may be equal to a difference of the cycling period and an adjusted baseline-off-duration. At block 508, a smallest number of HVAC systems from the sorted HVAC system that produces a true result from an HVAC selection expression may be determined.

Figure 6:
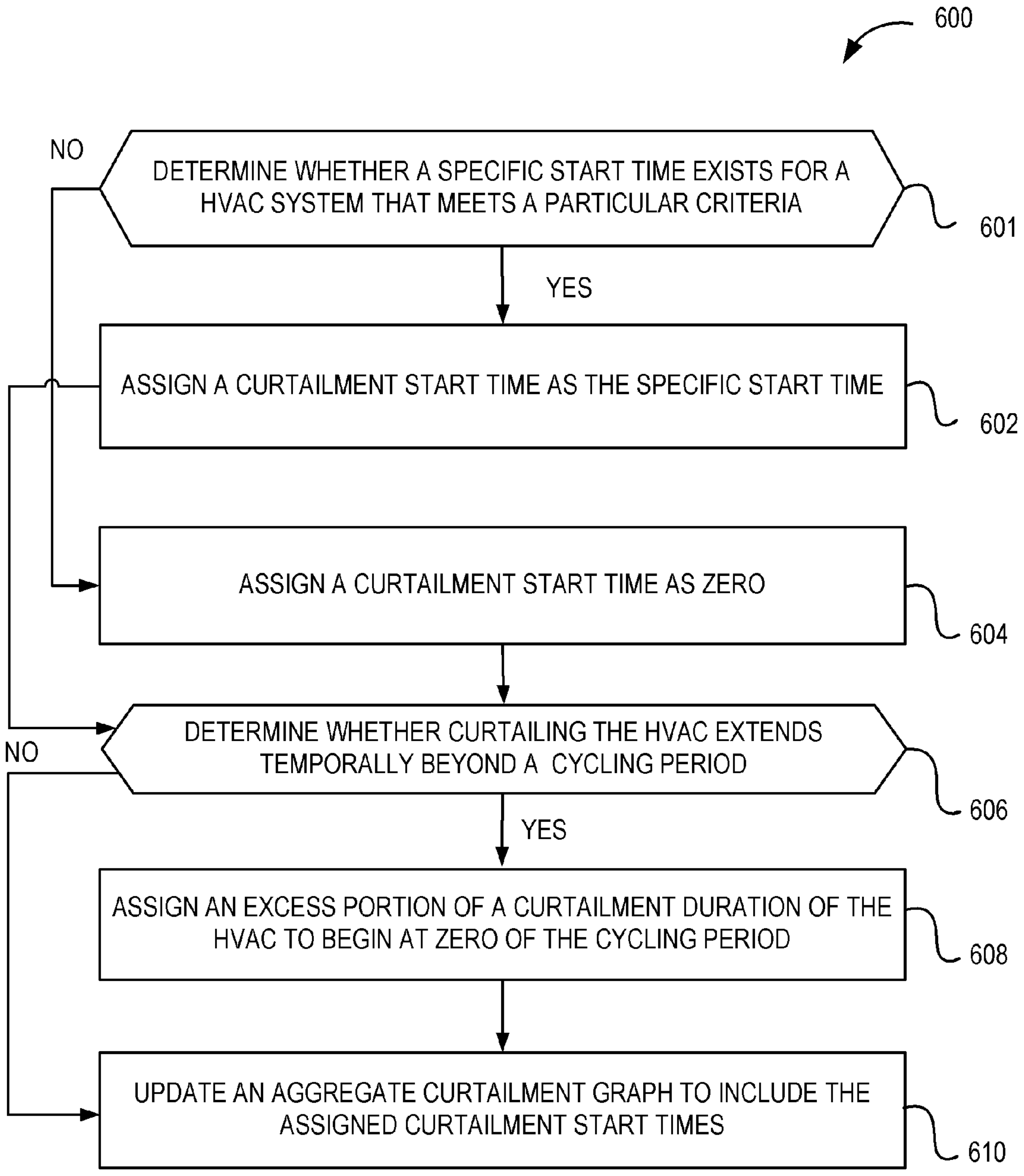
FIG. 6 is a flow diagram of an example method of assigning start times.

FIG. 6 is a flow diagram of an example method 600 of assigning curtailment start times of one or more HVAC systems, arranged in accordance with at least one embodiment described herein. Although illustrated as discrete blocks, various blocks may be divided into additional blocks, combined into fewer blocks, or eliminated, depending on the desired implementation. The method 600 is described with reference to an embodiment in which the devices are HVAC systems. The method 600 may be implemented in embodiments in which the devices include other types of devices. In some embodiments, the method 600 is an example of block 418 of FIG. 4.

The method 600 may begin at block 601, in which it may be determined whether a specific start time exists for an HVAC system that meets one or more criteria. The criteria may include the specific start time for the HVAC system being non-zero (e.g., greater than zero). The criteria may further include an aggregate curtailment envelope curve that is monotonically decreasing over time. In response to there being the specific start time that meets the one or more criteria ("YES" at block 601), the method 600 may proceed to block 602. In response to there not being the specific start time ("NO" at block 601) that meets the one or more criteria, the method 600 may proceed to block 604. At block 602, a curtailment start time may be assigned as a specific start time. At block 604, a curtailment start time may be assigned as zero.

At block 606, it may be determined whether curtailing the HVAC system extends temporally beyond a first cycling period. In response to the curtailing the HVAC system extending temporally beyond the first cycling period ("YES" at block 606), the method 600 may proceed to block 608. In response to the curtailing the HVAC system not extending temporally beyond a first cycling period ("NO" at block 606), the method 600 may proceed to block 610. At block 608, an excess portion of an off session may be assigned to begin at zero. At block 610, an aggregate curtailment graph may be updated to include the assigned curtailment start times.

Figure 7A:
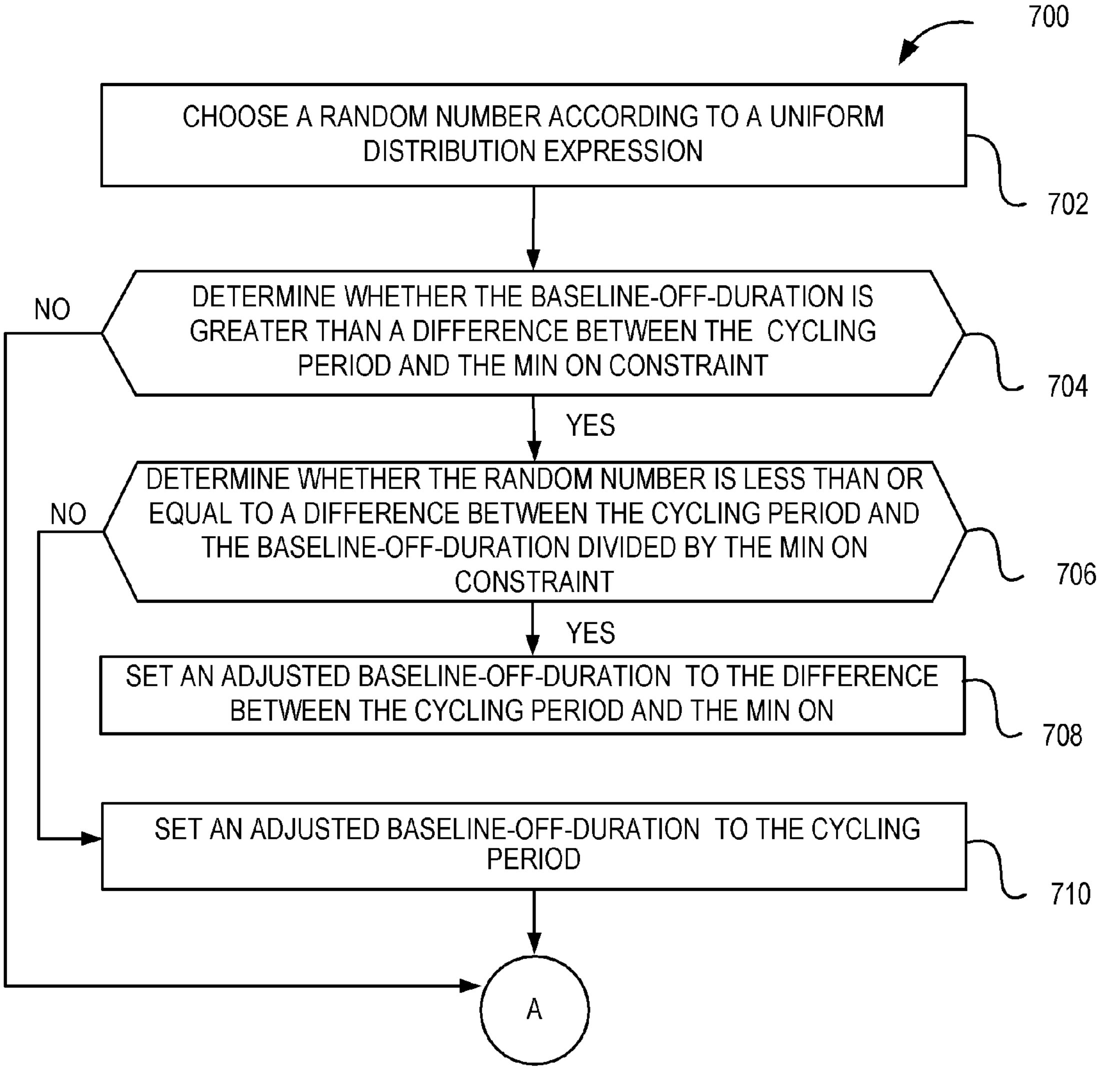
FIGS. 7A and 7B are a flow diagram of an example method of adjusting a baseline-off-duration, all arranged in accordance with at least one embodiment described herein.
Figure 7B:
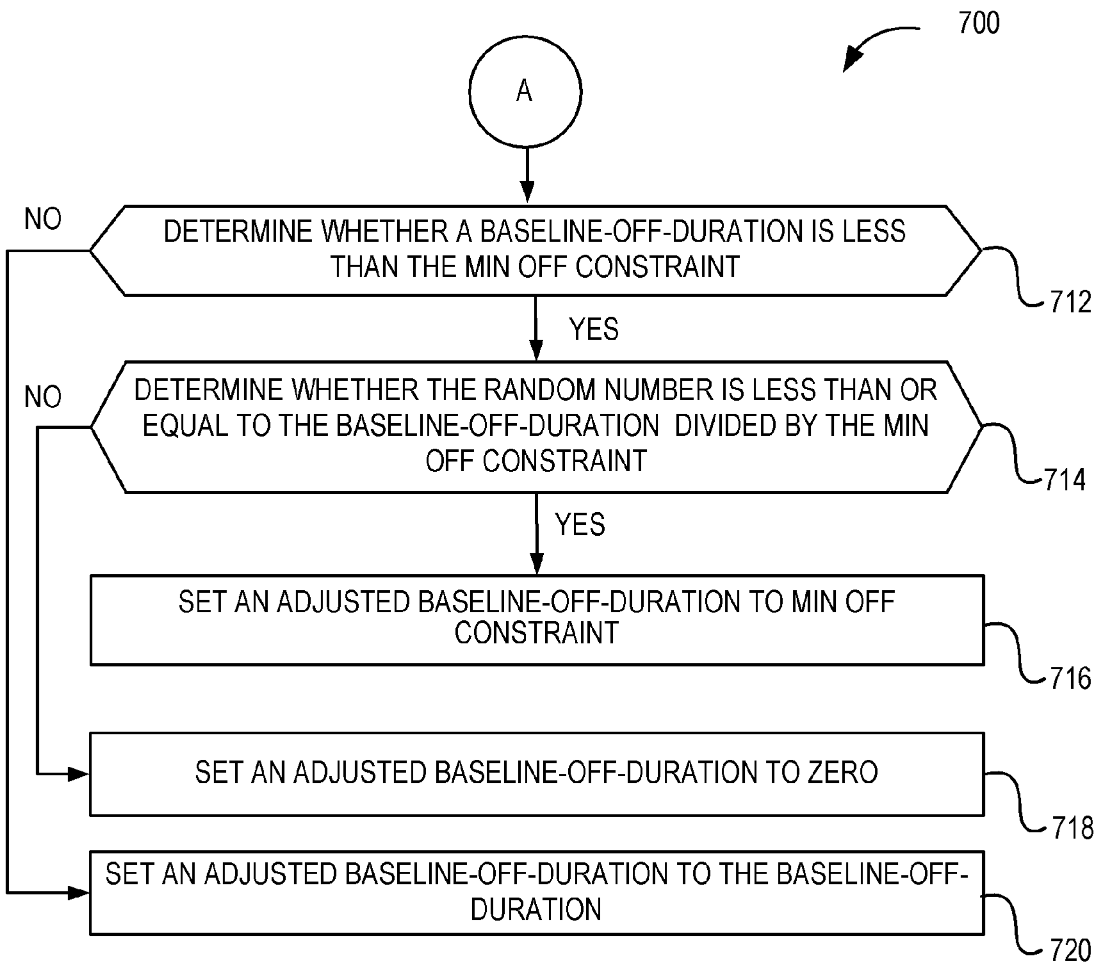

FIGS. 7A and 7B are a flow diagram of an example method 700 of adjusting a baseline-off-duration, arranged in accordance with at least one embodiment described herein. Although illustrated as discrete blocks, various blocks may be divided into additional blocks, combined into fewer blocks, or eliminated, depending on the desired implementation. The method 700 is described with reference to an embodiment in which the devices are HVAC systems. The method 700 may be implemented in embodiments in which the devices include other types of devices. In some embodiments, the method 700 is an example of block 414 of FIG. 4.

Referring to FIG. 7A, the method 700 may begin at block 702, in which a random number may be chosen. The random number may be chosen according to a uniform distribution expression and/or to be a uniform random variable on [0,1].

At block 704, it may be determined whether the baseline-off-duration is greater than a difference between a cycling period and a min on constraint. In response to the baseline-off-duration being greater than the difference between the cycling period and the min on constraint ("YES" at block 704), the method 700 may proceed to block 706. In response to the baseline-off-duration being less than the difference between a cycling period and a min on constraint ("NO" at block 704), the method 700 may proceed to block 712.

At block 706, it may be determined whether the random number is less than or equal to a difference between the cycling period and the baseline-off-duration divided by the min on constraint. In response to the random number being less than or equal to the difference between the cycling period and the baseline-off-duration divided by the min on constraint ("YES" at block 706), the method 700 may proceed to block 708. In response to the random number being greater than the difference between the cycling period and the baseline-off-duration divided by the min on constraint ("NO" at block 706), the method 700 may proceed to block 710.

At block 708, an adjusted baseline-off-duration may be set to the difference between the cycling period and the min on constraint. At block 710, an adjusted baseline-off-duration may be set to the cycling period.

At block 712, it may be determined whether the baseline-off-duration is less than the min off constraint. In response to the baseline-off-duration being less than the min off constraint ("YES" at block 712), the method 700 may proceed to block 714. In response to the baseline-offduration being greater than the min off constraint ("NO" at block 712), the method 700 may proceed to block 720.

At block 714, it may be determined whether the random number is less than or equal to the baseline-off-duration divided by the minimum time off. In response to the random number being less than or equal the baseline-off-duration divided by the minimum time off ("YES" at block 714), the method 700 may proceed to block 716. In response to the random number being greater the baseline-off-duration divided by the minimum time off ("NO" at block 714), the method 700 may proceed to block 718. At block 716, an adjusted baseline-off-duration may be set to a min off constraint. At block 718, an adjusted baseline-off-duration may be set to zero. At block 720, an adjusted baseline-off-duration may be set to the baseline-off-duration.

The method 700 is described for adjusting a baseline-off-duration. A method substantially similar to the method 700 may be implemented for adjusting a curtailed-off-duration. For example, such a variation of method 700 may be implemented for block 412 of the method 400.

The methods 400, 500, 600, and 700 may be performed in a DR system such as the DR system 100 of FIG. 1 in which the utility 104 provides energy to the sites 130. Similar methods may be implemented with necessary modifications in systems in which other resources are provided by the utility 104.

One or more of the methods 400, 500, 600, and 700 may be programmably performed in some embodiments by the DR server 106 described with reference to FIGS. 1 and 2, or some component thereof such as the analysis engine 170, the schedule engine 172, the controller module 108, the external controller system 174 or some combination thereof. In some embodiments, the DR server 106 or another computing device may include or may be communicatively coupled to a non-transitory computer-readable medium (e.g., the memory 132 of FIG. 1) having stored thereon programming code or instructions that are executable by a processor (such as the processor 134 of FIG. 1) to cause a computing device and/or the DR server 106 to perform one or more of the methods 400, 500, 600, and 700. Additionally or alternatively, the DR server 106 may include the processor 134 described above that is configured to execute computer instructions to cause the DR server 106 or another computing device to perform one or more of the methods 400, 500, 600, and 700.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of micro demand response (DR) scheduling, the method comprising:

generating, by a DR controller server, a duty cycle expression for at least one of heating, ventilation, air condition (HVAC) system of a plurality of HVAC systems that are located at a plurality of sites and configured for participation in a DR event;

estimating a baseline cycling percentage that maintains an indoor temperature at a particular setpoint based on the generated duty cycle expression;

estimating a curtailed cycling percentage that maintains the indoor temperature within a particular temperate interval of the particular setpoint;

calculating a baseline-off-duration in which the HVAC system is in an off state during a normal operating cycle;

calculating a curtailed-on-duration of the HVAC system that is implemented during a curtailment period;

adjusting the curtailed-on-duration to satisfy a minimum-time-on (min-on) constraint and a minimum-time-off (min-off) constraint of the HVAC system;

adjusting the baseline-off-duration of the HVAC system to satisfy the min-on constraint and the min-off constraint;

identifying one or more HVAC systems to include in a micro DR event based on an average curtailed load of the one or more HVAC systems and an average uncurtailed load of the one or more HVAC systems;

assigning, by the DR controller server, curtailment start times for each of the identified HVAC systems; and executing, by the DR controller server, a micro DR event according to the assigned curtailment start times at each of the identified HVAC systems.

2. The method of claim 1, wherein the duty cycle expression is generated according to a thermal model that provides HVAC duty cycles indirectly via approximating a physical thermal dynamics of the site and that estimates an indoor air temperature at a particular future time based on a sequence of controls executed on an operating state of the HVAC system and a sequence of weather data.

3. The method of claim 2, wherein the duty cycle expression is:

$$u = \frac{(1-\alpha)(\theta_{out}-\theta_{in})+\gamma}{\beta};$$

in which:

$\theta_{in}$ represents an indoor air temperature on thermostat at a time;

$\theta_{out}$ represents outdoor temperature at a time;

u represents a duty cycle of a corresponding device that returns a one in response to the HVAC system being in an operational state at a time and that returns a zero in response to the HVAC system not being in an operational state at the time; and β, γ, and α represent model parameters that are based on one or more of heat insulation at the site, usage of devices within a home, occupancy levels of the site, a day of the week, and β, γ, and α previously determined for the site.

4. The method of claim 1, wherein the duty cycle expression is generated according to a thermal module that provides HVAC duty cycles directly via a statistical model for the HVAC system based on a sequence of weather data.

5. The method of claim 4, wherein the duty cycle expression is defined by duty cycle equation:

$$u=a\theta_{in}+b\theta_{out}+c;$$

in which:

$\theta_{in}$ represents an indoor air temperature on thermostat at a time;

$\theta_{out}$ represents outdoor temperature at a time;

u represents a duty cycle of a corresponding device that returns a one in response to the HVAC system being in an operational state at a time and that returns a zero in response to the HVAC system not being in an operational state at the time; and a, b, and c represent model parameters computed by linear regression techniques.

6. The method of claim 1, wherein:

the baseline cycling percentage is estimated as a difference between one and the generated duty cycle expression in which a value of an indoor temperature parameter of the generated duty cycle expression is equated to the particular setpoint; and the curtailed cycling percentage is estimated as a difference between one and the generated duty cycle expression in which the value of the indoor temperature parameter is equated to a sum of the particular setpoint and the particular temperate interval.

7. The method of claim 1, wherein the identifying the one or more HVAC systems includes:

sorting the plurality of HVAC systems by decreasing cooling demand according to a sorting expression:

$$d_1>d_2>d_3> \dots >d_N;$$

for each of the plurality of HVAC systems, calculating the curtailed average load according to a curtailed average load expression:

$$\text{Curtailed\_Average\_Load}_i = d_i \times \frac{AdjustedCurtailedOnDuration_i}{T};$$

for each of the plurality of HVAC systems, calculating the uncurtailed average load according to an uncurtailed average load expression:

$$\text{UnCurtailed\_Average\_Load}_i = d_i \times \frac{AdjustedBaselineOnDuration_i}{T};$$

and determining a smallest number k that produces a true result from an HVAC selection expression:

$$\left(\sum_{i=0}^{k}\text{Curtailed\_Average\_Load}_i + \sum_{i=k+1}^{N}\text{Uncurtailed\_Average\_Load}_i\right) < D,$$

wherein:

i is an indexing variable that corresponds to a number of an HVAC system when sorted by decreasing cooling demand;

d represents a cooling demand of an HVAC system;

Curtailed_Average_Load represents an average curtailed load for an HVAC system;

Uncurtailed_Average_Load represents an average uncurtailed load for an HVAC system;

AdjustedBaselineOnDuration represents an adjusted baseline-on-duration in which the HVAC system is in an on state during normal operating cycle;

AdjustedCurtailedOnDuration represents an adjusted curtailed-on-duration that is implemented during a curtailment period;

D represents a target load;

N represents the indexing variable of the HVAC system having the smallest cooling demand; and T represents a cycling period.

8. The method of claim 1, wherein the assigning includes:

determining whether a specific start time exists that is non-zero and results in an aggregate curtailment envelope curve that is monotonically decreasing over time;

in response to there not being the specific start time, assigning a curtailment start time as zero;

determining whether curtailing the HVAC extends temporally beyond a first cycling period; and in response to the curtailing the HVAC system extending temporally beyond the first cycling period, assigning an excess portion of a curtailment duration to begin at zero.

9. The method of claim 1, further comprising:

reverting each device to the baseline cycling percentage; and releasing control of the HVAC systems after the setpoint temperature is reached or a dead band of the setpoint temperature is reached.

10. The method of claim 1, wherein the adjusting the baseline-off-duration includes:

choosing a random number according to a uniform distribution expression;

determining whether the baseline-off-duration is greater than a difference between a cycling period and the min on constraint;

in response to the baseline-off-duration being greater than the difference between a cycling period and a min on constraint, determining whether the random number is less than or equal to a difference between the cycling period and the baseline-off-duration divided by the min on constraint;

in response to the random number being less than or equal to the difference between the cycling period and the baseline-off-duration divided by the min on constraint, setting an adjusted baseline-off-duration to the difference between the cycling period and the min on constraint;

in response to the random number being greater than the difference between the cycling period and the baseline-off-duration divided by the min on constraint, setting an adjusted baseline-off-duration to the cycling period;

determining whether the baseline-off-duration is less than the min off constraint;

in response to the baseline-off-duration being less than the min off constraint, determining whether the random number is less than or equal to the baseline-off-duration divided by the min off constraint;

in response to the random number being less than or equal the baseline-off-duration divided by the min off constraint, setting an adjusted baseline-off-duration to the min off constraint;

in response to the random number being greater than the baseline-off-duration divided by the min off constraint, setting an adjusted baseline-off-duration to zero; and in response to the baseline-off-duration being greater than the min off constraint and the baseline-off-duration being less than the difference between a cycling period and a min on constraint, setting an adjusted baseline-off-duration to the baseline-off-duration.

11. A non-transitory computer-readable medium having encoded therein programming code executable by one or more processors to perform operations comprising:

generating a duty cycle expression for at least one of heating, ventilation, air condition (HVAC) system of a plurality of HVAC systems that are located at a plurality of sites and configured for participation in a DR event;

estimating a baseline cycling percentage that maintains an indoor temperature at a particular setpoint based on the generated duty cycle expression;

estimating a curtailed cycling percentage that maintains the indoor temperature within a particular temperate interval of the particular setpoint;

calculating a baseline-off-duration in which the HVAC system is in an off state during a normal operating cycle;

calculating a curtailed-on-duration of the HVAC system that is implemented during a curtailment period;

adjusting the curtailed-on-duration to satisfy a minimum-time-on (min-on) constraint and a minimum-time-off (min-off) constraint of the HVAC system;

adjusting the baseline-off-duration of the HVAC system to satisfy the min-on constraint and the min-off constraint;

identifying one or more HVAC systems to include in a micro DR event based on an average curtailed load of the one or more HVAC systems and an average uncurtailed load of the one or more HVAC systems;

assigning curtailment start times for each of the identified HVAC systems; and executing a micro DR event according to the assigned curtailment start times at each of the identified HVAC systems.

12. A non-transitory computer-readable medium of claim 11, wherein the duty cycle expression is generated according to a thermal model that provides HVAC duty cycles indirectly via approximating a physical thermal dynamics of the site and that estimates an indoor air temperature at a particular future time based on a sequence of controls executed on an operating state of the HVAC system and a sequence of weather data.

13. A non-transitory computer-readable medium of claim 12, wherein the duty cycle expression is:

$$u = \frac{(1-\alpha)(\theta_{out} - \theta_{in}) + \gamma}{\beta};$$

in which:

$\theta_{in}$ represents an indoor air temperature on thermostat at a time;

$\theta_{out}$ represents outdoor temperature at a time;

u represents a duty cycle of a corresponding device that returns a one in response to the HVAC system being in an operational state at a time and that returns a zero in response to the HVAC system not being in an operational state at the time; and β, γ, and α represent model parameters that are based on one or more of heat insulation at the site, usage of devices within the home, occupancy levels of the site, a day of the week, and β, γ, and α previously determined for the site.

14. A non-transitory computer-readable medium of claim 11, wherein the duty cycle expression is generated according to a thermal module that provides HVAC duty cycles directly via a statistical model for the HVAC system based on a sequence of weather data.

15. A non-transitory computer-readable medium of claim 14, wherein the duty cycle expression is defined by duty cycle equation:

$$u = \alpha\theta_{in} + b\theta_{out} + c;$$

in which:

$\theta_{in}$ represents an indoor air temperature on thermostat at a time;

$\theta_{out}$ represents outdoor temperature at a time;

u represents a duty cycle of a corresponding device that returns a one in response to the HVAC system being in an operational state at a time and that returns a zero in response to the HVAC system not being in an operational state at the time; and a, b, and c represent model parameters computed by linear regression techniques.

16. A non-transitory computer-readable medium of claim 11, wherein:

the baseline cycling percentage is estimated as a difference between one and the generated duty cycle expression in which a value of an indoor temperature parameter of the generated duty cycle expression is equated to the particular setpoint; and the curtailed cycling percentage is estimated as a difference between one and the generated duty cycle expression in which the value of the indoor temperature parameter is equated to a sum of the particular setpoint and the particular temperate interval.

17. A non-transitory computer-readable medium of claim 11, wherein: wherein the identifying the one or more HVAC systems includes:

sorting the plurality of HVAC systems by decreasing cooling demand according to a sorting expression:

$$d_1 > d_2 > d_3 > \ldots > d_N;$$

for each of the plurality of HVAC systems, calculating the curtailed average load according to a curtailed average load expression:

$$\text{Curtailed\_Average\_Load}_i = d_i \times \frac{AdjustedCurtailedOnDuration_i}{T};$$

for each of the plurality of HVAC systems, calculating the uncurtailed average load according to an uncurtailed average load expression:

$$\text{Uncurtailed\_Average\_Load}_i = d_i \times \frac{AdjustedBaselineOnDuration_i}{T};$$

and determining a smallest number k that produces a true result from an HVAC selection expression:

$$\left(\sum_{i=0}^{k} \text{Curtailed\_Average\_Load}_i + \sum_{i=k+1}^{N} \text{Uncurtailed\_Average\_Load}_i\right) < D,$$

wherein:

i is an indexing variable that corresponds to a number of an HVAC system when sorted by decreasing cooling demand;

d represents a cooling demand of an HVAC system;

Curtailed_Average_Load represents an average curtailed load for an HVAC system;

Uncurtailed_Average_Load represents an average uncurtailed load for an HVAC system;

AdjustedBaselineOnDuration represents an adjusted baseline-on-duration in which the HVAC system is in an on state during normal operating cycle;

AdjustedCurtailedOnDuration represents an adjusted curtailed-on-duration that is implemented during a curtailment period;

D represents a target load;

N represents the indexing variable of the HVAC system having the smallest cooling demand; and T represents a cycling period.

18. The non-transitory computer-readable medium of claim 11, the assigning includes:

determining whether a specific start time exists that is non-zero and results in an aggregate curtailment envelope curve that is monotonically decreasing over time;

in response to there not being the specific start time, assigning a curtailment start time as zero;

determining whether curtailing the HVAC extends temporally beyond the first cycling period; and in response to the curtailing the HVAC system extending temporally beyond a first cycling period, assigning an excess portion of a curtailment duration to begin at zero.

19. The non-transitory computer-readable medium of claim 11, wherein the operations further comprise:

reverting each device to the baseline cycling percentage; and releasing control of the HVAC systems after the setpoint temperature is reached or a dead band of the setpoint temperature is reached.

20. The non-transitory computer-readable medium of claim 11, wherein the adjusting the baseline-off-duration includes:

choosing a random number according to a uniform distribution expression;

determining whether the baseline-off-duration is greater than a difference between a cycling period and the min on constraint;

in response to the baseline-off-duration being greater than the difference between a cycling period and a min on constraint, determining whether the random number is less than or equal to a difference between the cycling period and the baseline-off-duration divided by the min on constraint;

in response to the random number being less than or equal to the difference between the random number and the baseline-off-duration divided by the min on constraint, setting an adjusted baseline-off-duration to the difference between the cycling period and the min on constraint;

in response to the random number being greater than the difference between the cycling period and the baseline-off-duration divided by the min on constraint, setting an adjusted baseline-off-duration to the cycling period;

determining whether the baseline-off-duration is less than the min off constraint;

in response to the baseline-off-duration being less than the min off constraint, determining whether the random number is less than or equal to the baseline-off-duration divided by the min off constraint;

in response to the random number being less than or equal the baseline-off-duration divided by the min off constraint, setting an adjusted baseline-off-duration to the min off constraint;

in response to the random number being greater than the baseline-off-duration divided by the min off constraint, setting an adjusted baseline-off-duration to zero; and in response to the baseline-off-duration being greater than the min off constraint and the baseline-off-duration being less than the difference between a cycling period and a min on constraint, setting an adjusted baseline-off-duration to the baseline-off-duration.

* * * * *